(12) United States Patent
Geissinger

(10) Patent No.: US 10,496,665 B2
(45) Date of Patent: Dec. 3, 2019

(54) DATABASE SYSTEM INCORPORATING DOCUMENT STORE

(71) Applicant: SAP SE, Walldorf (DE)

(72) Inventor: Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 244 days.

(21) Appl. No.: 15/354,921

(22) Filed: Nov. 17, 2016

(65) Prior Publication Data

US 2018/0137144 A1    May 17, 2018

(51) Int. Cl.
*G06F 16/25* (2019.01)
*G06F 16/182* (2019.01)
*G06F 16/23* (2019.01)

(52) U.S. Cl.
CPC ............ *G06F 16/25* (2019.01); *G06F 16/182* (2019.01); *G06F 16/2308* (2019.01); *G06F 16/2379* (2019.01)

(58) Field of Classification Search
CPC ......... G06F 17/30283; G06F 17/30584; G06F 16/182; G06F 16/2308; G06F 16/2379; G06F 16/25
USPC .......................................................... 707/770
See application file for complete search history.

(56) References Cited

U.S. PATENT DOCUMENTS

| | | | | |
|---|---|---|---|---|
| 6,374,243 B1* | 4/2002 | Kobayashi | ............ | G06F 16/256 707/703 |
| 6,728,879 B1* | 4/2004 | Atkinson | ............... | G06Q 30/06 707/802 |
| 7,653,651 B1* | 1/2010 | Pavlov | ................ | G06F 16/2343 707/803 |
| 9,208,081 B1* | 12/2015 | Dice | .................... | G06F 12/0269 707/813 |
| 9,460,008 B1* | 10/2016 | Leshinsky | ........... | G06F 12/0253 707/672 |
| 9,881,054 B2* | 1/2018 | Cao | ...................... | G06F 16/2423 707/731 |
| 2007/0219959 A1* | 9/2007 | Kanemasa | ........ | G06F 17/30545 |
| 2008/0114724 A1* | 5/2008 | Indeck | .................. | G06F 16/353 707/716 |
| 2010/0161569 A1* | 6/2010 | Schreter | .............. | G06F 16/2272 707/696 |
| 2013/0066948 A1* | 3/2013 | Colrain | ................. | H04L 67/146 709/203 |
| 2014/0032579 A1* | 1/2014 | Merriman | ............. | G06F 16/258 707/756 |
| 2014/0222758 A1* | 8/2014 | March | ................. | G06F 16/1873 707/638 |
| 2014/0280047 A1* | 9/2014 | Shukla | .............. | G06F 17/30964 707/722 |

(Continued)

*Primary Examiner* — Shahid A Alam
(74) *Attorney, Agent, or Firm* — Jones Day

(57) ABSTRACT

A query is received from a client that specifies at least one database operation implicating data within a first database and within a second database. The second database includes a document store storing a collection of documents. Thereafter, a plurality of transactions responsive to the query are initiated to access the data within the first database and the second database. Execution of the plurality of transactions are coordinated between the first database and the second database. All changes specified by the at least one database operation are persisted in the first database including changes implicating data stored within the second database. Data responsive to the query can then be provided to the client.

17 Claims, 9 Drawing Sheets

(56) References Cited

U.S. PATENT DOCUMENTS

| | | | | |
|---|---|---|---|---|
| 2015/0095307 | A1* | 4/2015 | Bensberg | G06F 16/185 707/714 |
| 2015/0100662 | A1* | 4/2015 | Kaczmarek | H04L 67/1097 709/213 |
| 2015/0261839 | A1* | 9/2015 | Namburi | G06F 16/278 707/610 |
| 2015/0370825 | A1* | 12/2015 | Outcalt | G06F 16/178 707/608 |
| 2016/0117410 | A1* | 4/2016 | Kamiya | G06F 16/9024 715/242 |
| 2016/0328438 | A1* | 11/2016 | Bacalzo | G06F 16/2343 707/689 |

* cited by examiner

DATABASE SYSTEM INCORPORATING DOCUMENT STORE

TECHNICAL FIELD

The subject matter described herein relates to a database system incorporation a document store.

BACKGROUND

Companies continue to generate increasingly larger amounts of data year over year. Rapid and convenient access to such data by a large number of concurrent users can present problems. For example, a company may store data across multiple databases of varying types which may be distributed amongst various computing nodes. These types can vary differently such as the manner in which data is stored, structured, and accessed. Typical computing architectures require separate and distinct queries to access data within the respective database types.

SUMMARY

In a first aspect, a query is received from a client that specifies at least one database operation implicating data within a first database and within a second database. The second database includes a document store storing a collection of documents. Thereafter, a plurality of transactions responsive to the query are initiated to access the data within the first database and the second database. Execution of the plurality of transactions are coordinated between the first database and the second database. All changes specified by the at least one database operation are persisted in the first database including changes implicating data stored within the second database. Data responsive to the query can then be provided to the client.

The first database can be an in-memory relational database and the second database can be a database storing data on physical disk storage.

The document store can store a collection of documents in a variety of formats including, for example, JavaScript Object Notation (JSON) format.

The document store can have a plurality of partitions defined by a partition specification. Each partition can include a plurality of slices and can include at least one index. Each slice can have a plurality of segments in which documents are stored. Each slice can include a document vector comprising pointers to each of the documents. Each document can have a document header encapsulating metadata characterizing the corresponding document.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter is advantageous in that it allows for a single query to access/manipulate data within different database types (e.g., disk-based databases and in-memory database, etc.) including a document store. In addition, the current subject matter permits the management of transactions specified by such queries across different database types that typically would require complex coordination and/or separately processed transactions.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to the interplay among two or more databases when concurrently executing multiple transactions in which one of the databases is a document store. In some variations, a first database acts as a master database and the other acts as a slave database with regard to transaction management. In some implementations, both databases are relational databases; however, they can differ in the manner in which they store data. For example, one database can be disk-based while the other database can be an in-memory database storing data in main memory.

Figure 1:
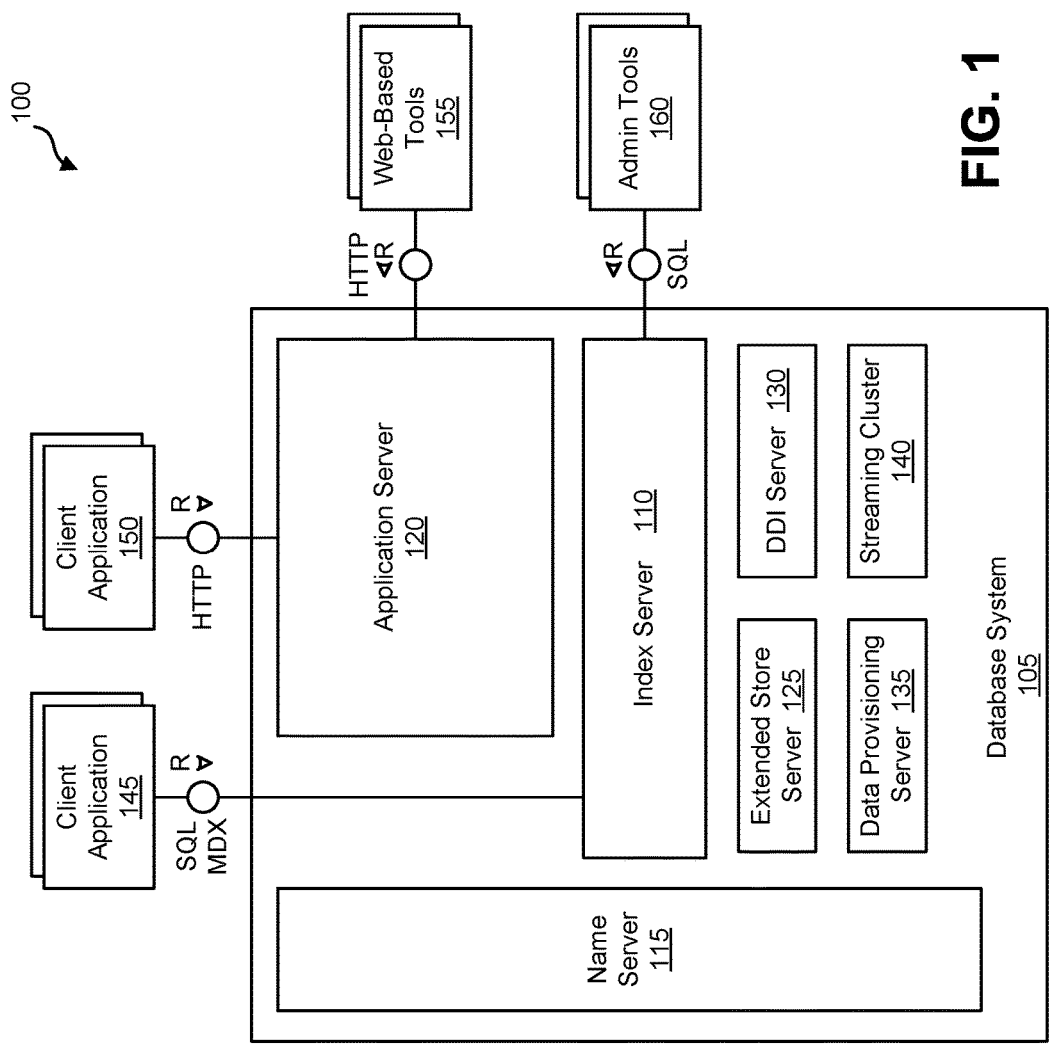
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
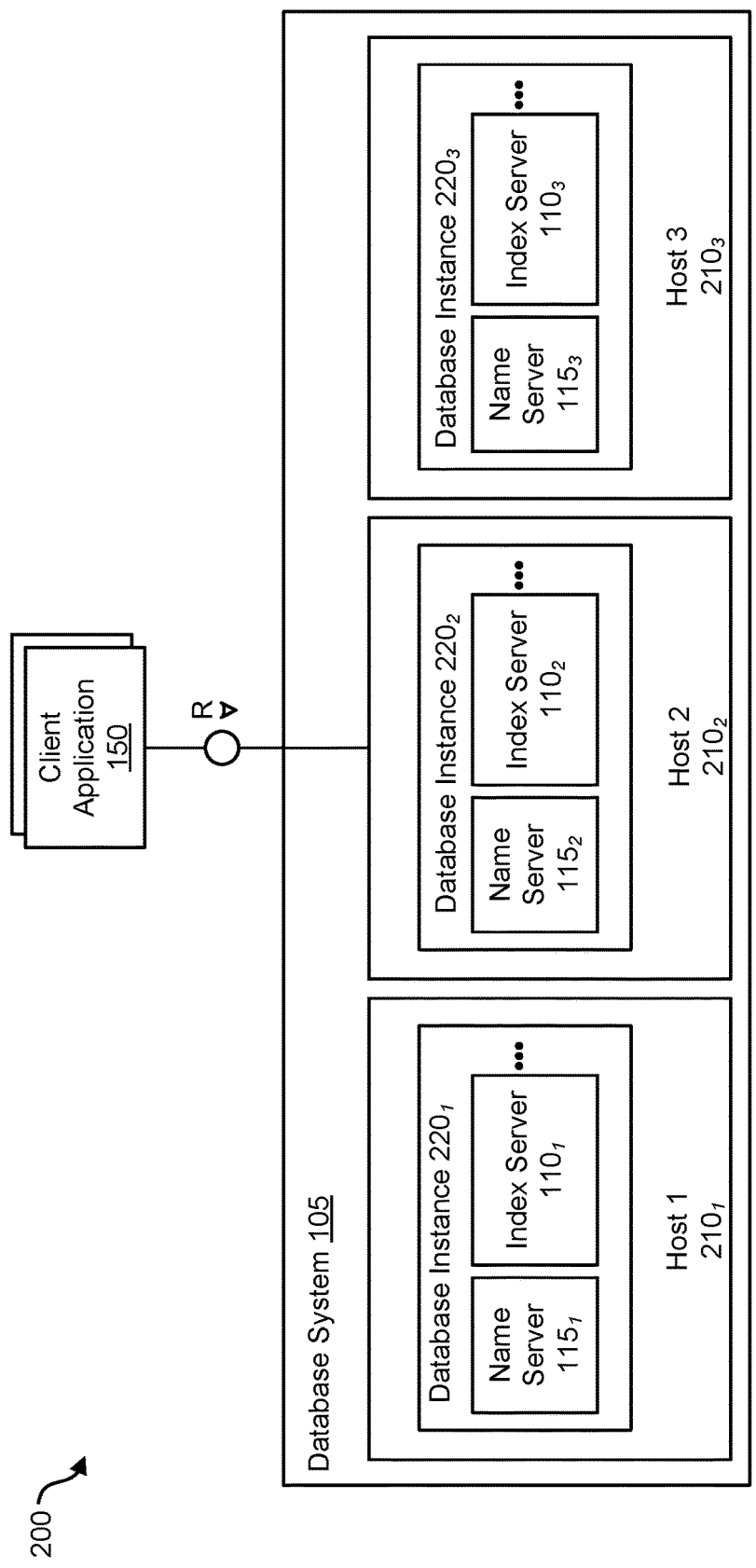
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
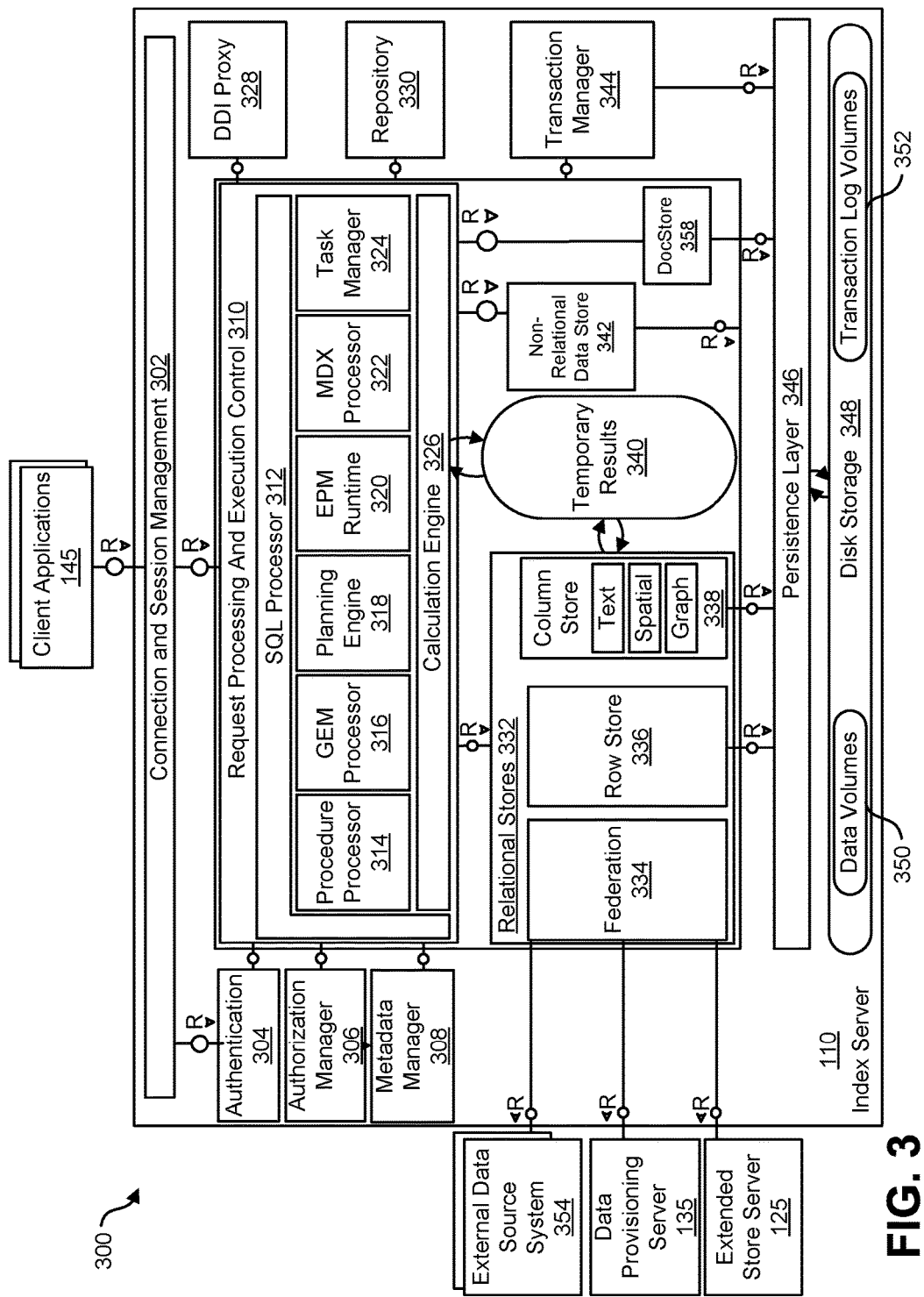
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

Furthermore, the database system 105 can include a document store (DocStore) 358. In some arrangements, the DocStore 358 is external to the database system 105. In either arrangement, the DocStore 358 is in communication with the index server 125. The DocStore 358 is a document-oriented data store for storing, retrieving, and managing document oriented/semi-structured data (referred to herein as documents). The documents within the DocStore 358 can encapsulate and encode data in various formats such as, for example, Extensible Markup Language (XML), YAML, JavaScript Object Notation (JSON), BSON, and the like. For illustration purposes (unless otherwise specified), references are made herein of the DocStore 358 comprising a collection of JSON documents. The DocStore 358 can store the documents in physical persistence such as disk storage and/or the documents can be loaded into main memory.

The client applications 145 can initiate various transactions that involve both data within the index server 110 (e.g., data stored in the relational store 332, the non-relational data store 342, disk storage 348, etc.) as well as data within the DocStore 358. Stated differently, the database system 105 can have the same or overlapping transaction boundaries with the DocStore 358 so that coordination is required amongst the various data sources. In an arrangement, the transaction manager 344 can be made the leading or dominant transaction manager so that transaction managing facilities of the DocStore 358 or another "slave" database can be channeled and managed by transaction manager 344. Documents within the DocStore 358 can be accessed or otherwise manipulated via various protocols. For example, client applications 145 can initiate various database manipulation language (DML) statements to select, insert, delete and update data encapsulated in documents within the DocStore 358. Similarly, the client applications 145 can initiate various data definition language (DDL) statements to create, drop, alter, and rename data encapsulated within documents within the DocStore 358. As a further example, the client applications 145 can use other protocols such as QL to retrieve data encapsulated within documents in the DocStore 358.

The DocStore 358 can comprise a persistence manager as well as a separate transaction manager. The persistence manager can cause data written into the DocStore to be written into the disk storage 348 (i.e., the persistence) of the database system 105. Despite the DocStore 358 being an independent database or data store with its own dedicated binary data format, the persistence 348 of the main database system 105 can be utilized. The transaction manager of the DocStore 358 can concurrently notify the transaction manager 344 of the index server 110 about the changes. The transaction manager 344 then oversees the commit of the data using a commit writer that assigns commit IDs to the data stored in the disk storage 348.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
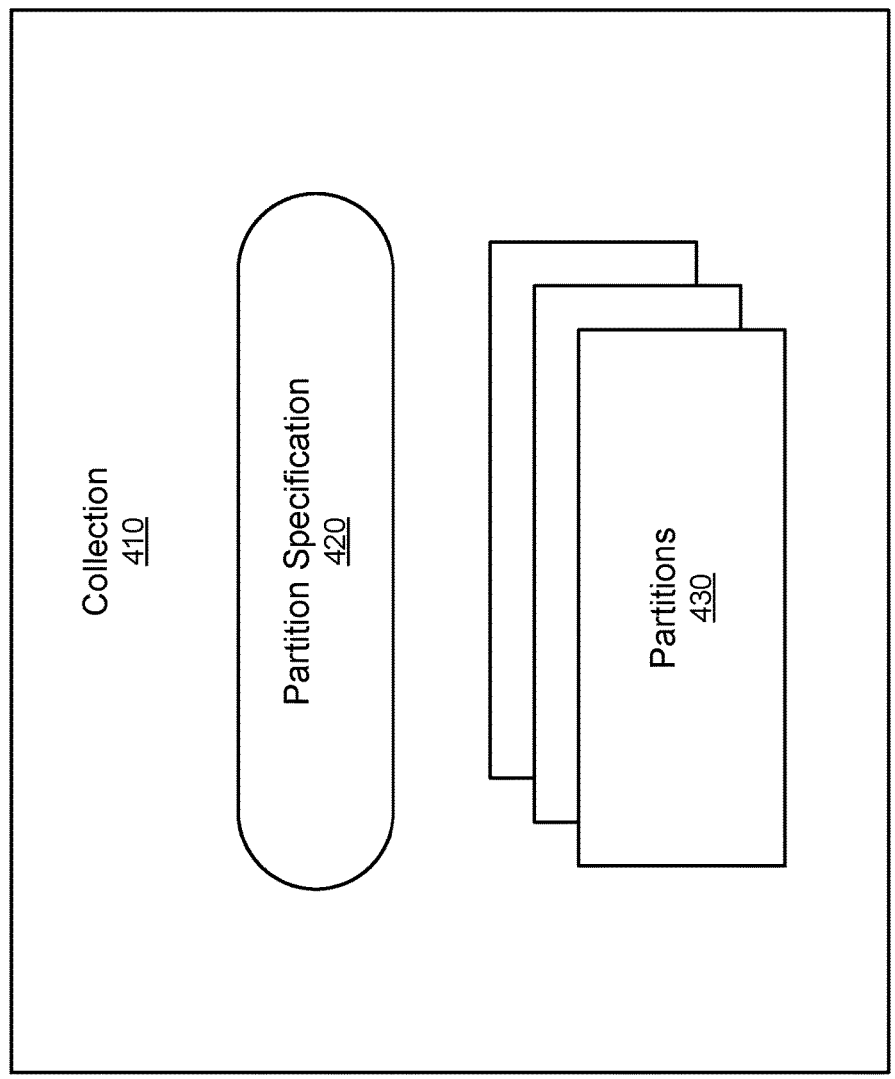
FIG. 4 is a system diagram of a document store.
Figure 5:
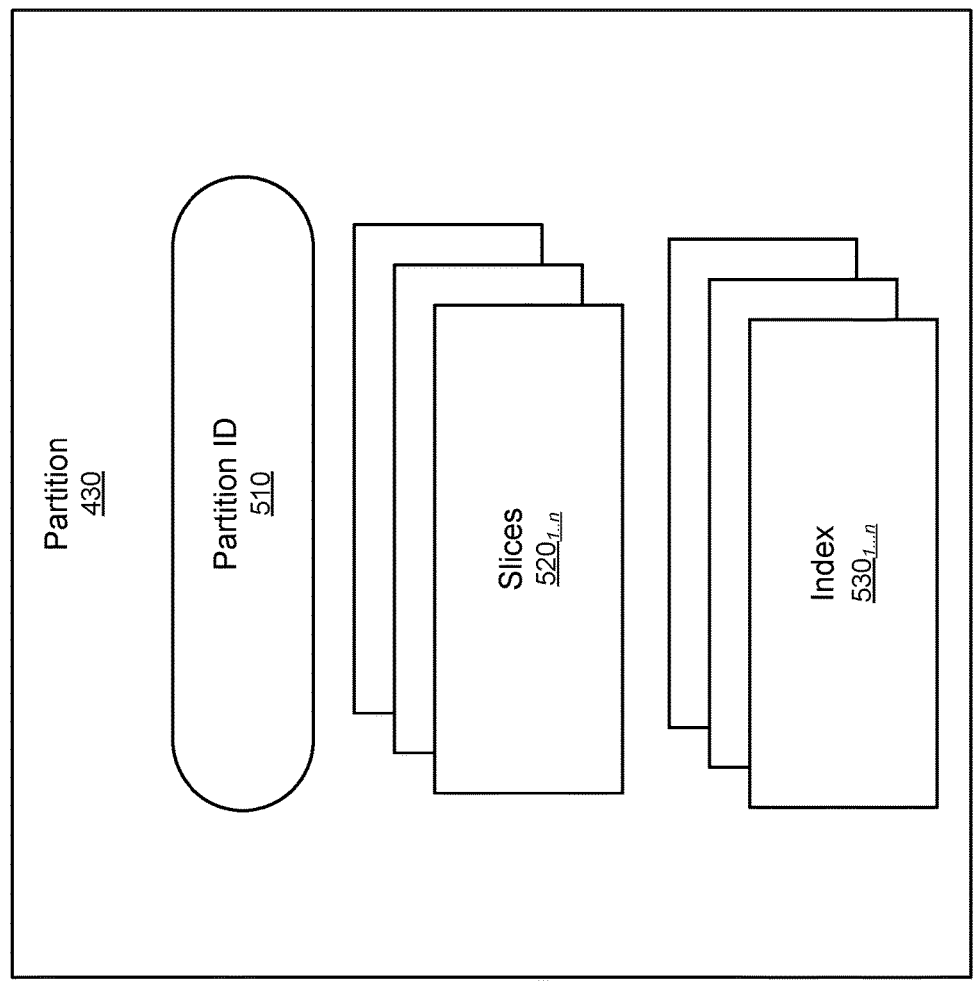
FIG. 5 is a system diagram of a partition of the document store as in FIG. 6.

With reference to diagram 400 of FIG. 4, the DocStore 358 organizes documents in collections 410. As noted above, the documents within the DocStore 358 can take different formats and the use below of JSON documents is for illustrative purposes (unless otherwise specified). A collection of documents 410 can be characterized as being a list of documents. A collection of documents 410 can have several partitions $430_{1...n}$ which can be collectively defined by a partition specification 420. The partition specification 420 cab define how the collection of documents are to be grouped or otherwise split amongst the partitions.

Figure 6:
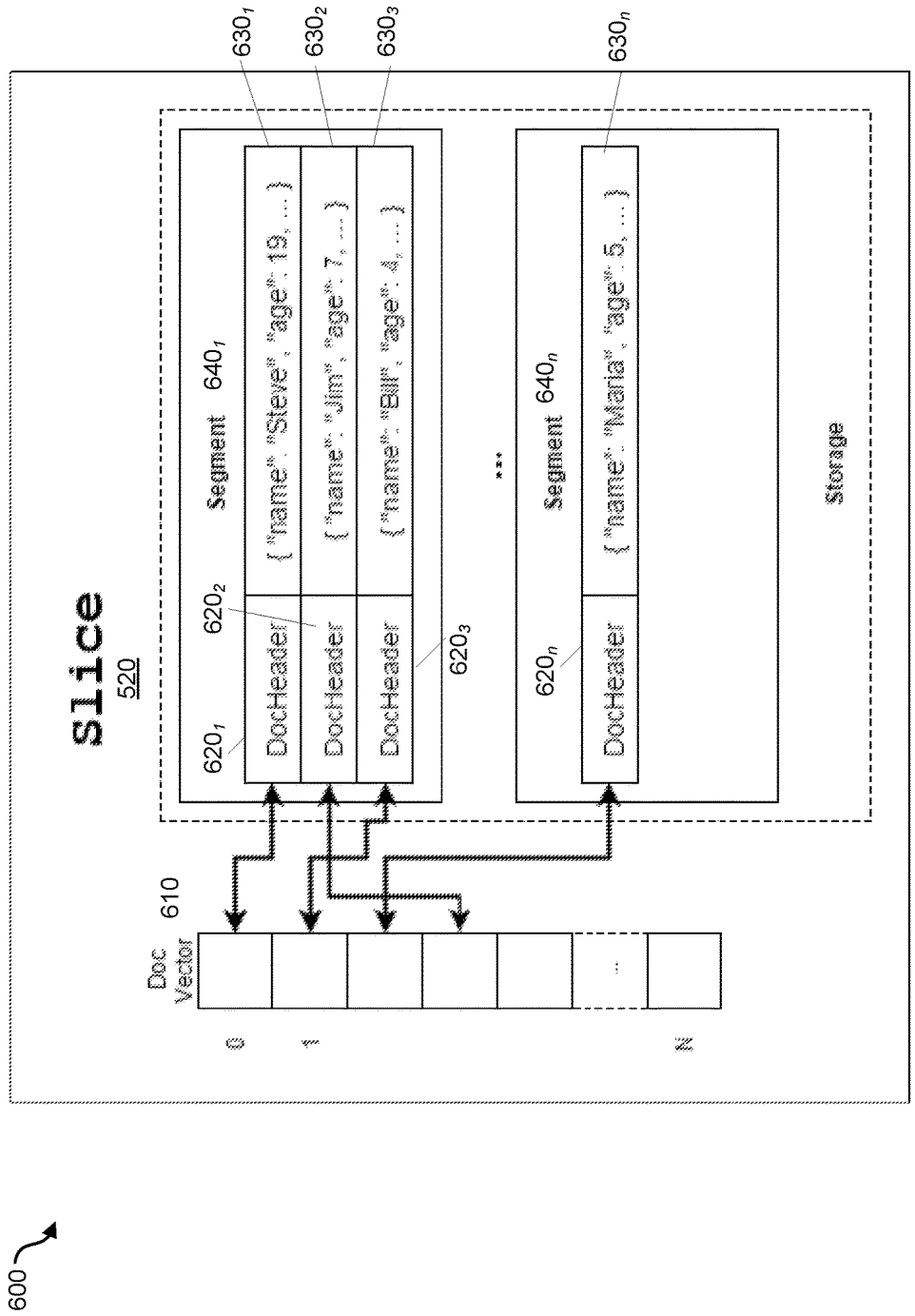
FIG. 6 is a first diagram illustrating a slice of a partition of the document store as in FIG. 5.

Diagram 500 of FIG. 6 illustrates contents of a partition 520. Each partition 520 can comprise a unique identification 610 and the documents within such partition 520 are stored within a slice 620. Furthermore, each partition 520 can include at least one index 630 for mapping terms and the like to sections of the documents. In other variations, indexes can be omitted in some or all of the partitions 520.

Diagram 600 of FIG. 6 illustrates a slice 520. As noted, each slice 520 can comprise a document vector (DocVector) 610 which stores pointers to document headers (DocHeaders) $620_{1...n}$ of documents $630_{1...n}$. Each document header 620 comprises required metadata about the corresponding document 630. For example, the document header 620 can comprise a pointer to an older version of the corresponding document (when the document has been updated). The document header 620 can comprise a pointer to a newer version of the document 630; however, if there is not a newer version of the document 630, then the document header 620 stores the position in the document vector 610 that points to the document 630.

Each document header 620 can comprise a create timestamp that specifies with which transaction the document header 620 was created. The document header 620 can, in some variations, comprise a tombstone flag which, when set, can indicate that the document 630 to which the pointer to the older version of the document points has been deleted.

The documents $630_{1...n}$ can be stored in segments $640_{1...n}$. A segment 640 is a chunk of memory which can store multiple documents 630 and their corresponding document headers 620. This arrangement is provided to reduce memory fragmentation and increase insert performance, because multiple documents 630 can be put into one segment 640 without having to perform a memory allocation for each new document.

Figure 7:
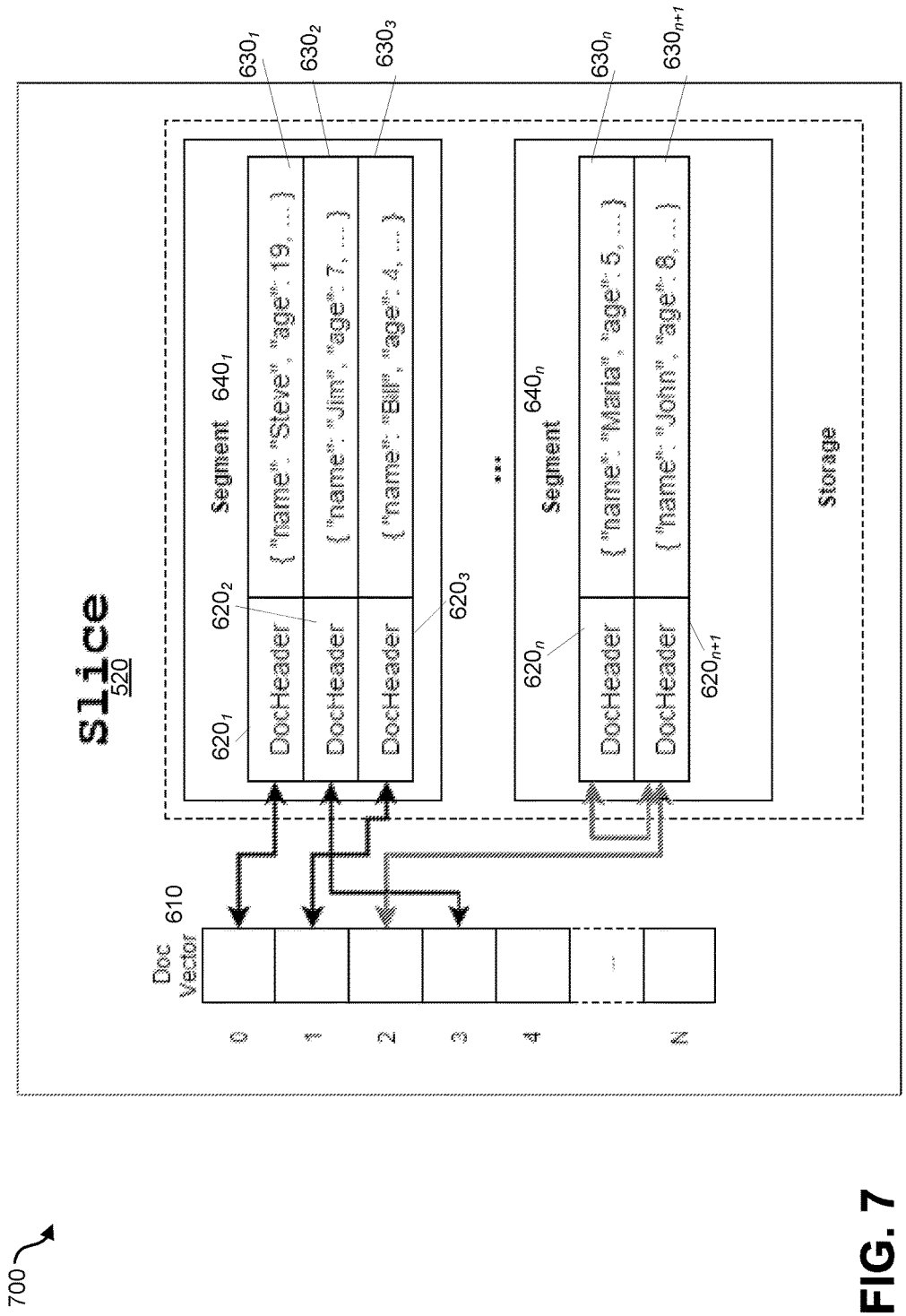
FIG. 7 is a second diagram illustrating a slice of a partition of the document store as in FIG. 5.
Figure 8:
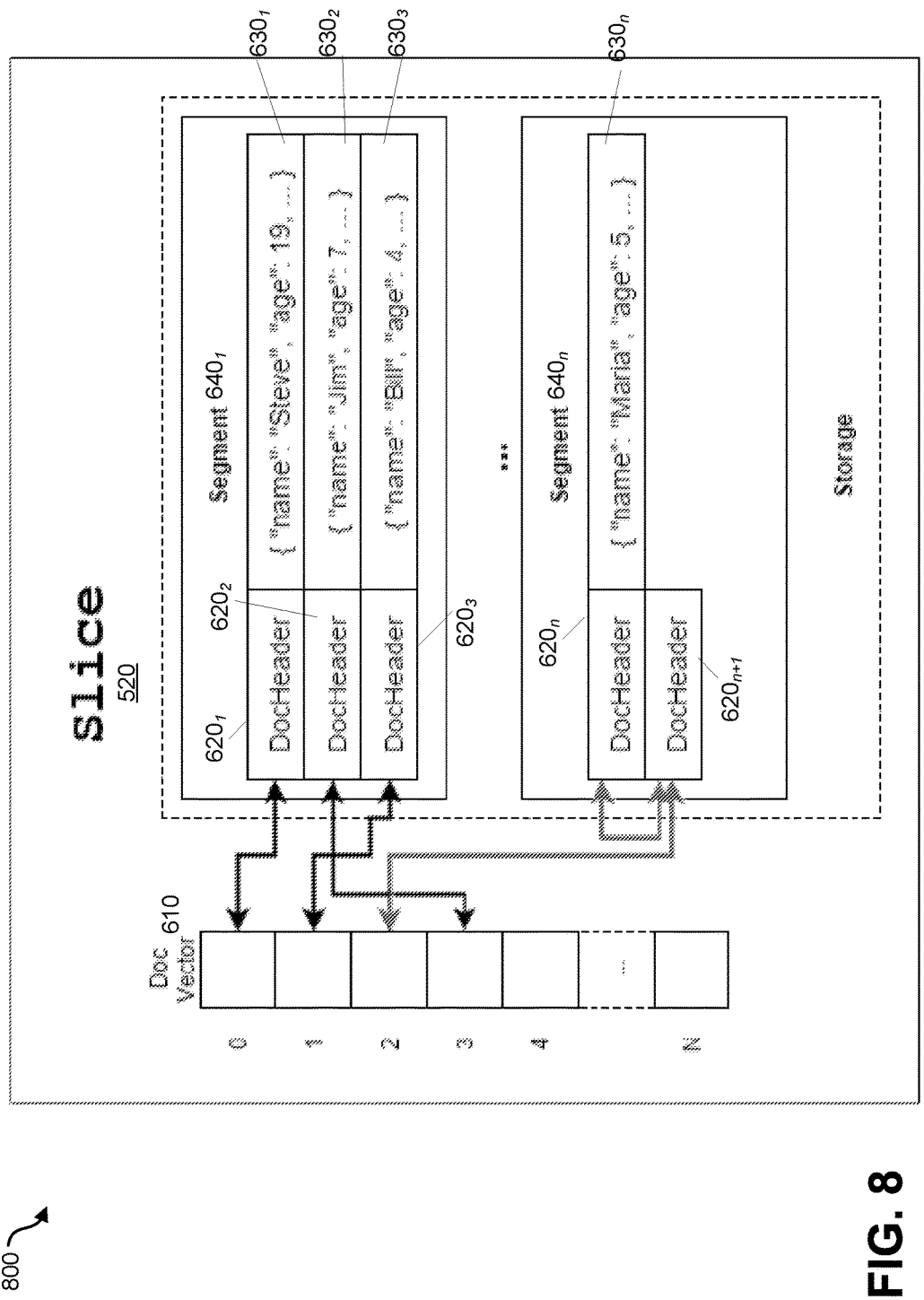
FIG. 8 is a third diagram illustrating a slice of a partition of the document store as in FIG. 5.

The following is an example of how a document at position 2 of the document vector 610 can be updated and makes reference to diagram 700 of FIG. 7. The new version of the document 630 can be written to some free space on one of the segments 640. For the new version, the pointer to the previous version can be stored in the document header 620 and the pointer from the document vector 620 to the old version can be removed. Position 2 of the document vector 610 then can point to the new version. The document header 610 of the older version can be updated to point to the new version. Stated differently, the document versions can then form a doubly linked list.

Depending on the transaction's visibility one transaction may see the newer, older or none of these version. To find out which version of the document 630 is visible for the transaction, the version list can be scanned from the beginning (the most recent version is always at the beginning to reduce scan costs) until a visible version of the document 630 is reached or the end of the version list is reached.

A delete operation in the document store 358 is similar to that of an update operation with two differences. If a document 630 is deleted, a new document header 620 can be created on a segment 640 which points to the old and to be deleted document 630. However, this document header 620 is not followed by any new content/document, so it is only the header portion. Additionally, the tombstone flag can be set in the header. This new version of the document 630 can then act as a deleted marker. Such an arrangement is useful because the delete might not yet be visible to all concurrent running transactions. So for each transaction it needs to scan the version chain to find out the visible one. If this happens to be the document header 620 with the tombstone flag set then the delete of the document is visible to the transaction and the transaction can simply ignore this document header 620.

A document position (DocumentPos) can be unique identifier of a document 630 inside of a collection. The document position can include the partition ID 510, an ID of the slice 520 (slice ID), and the offset in the slice (the index in the document vector 610).

With the DocStore 358, over time, more and more gaps in the segments can result from updates and deletes, because the older version are no longer visible to any open transactions. To reuse this space (i.e., allocated memory) again, a cleanup job can be run. This cleanup job can run periodically, scan each segment 640 and copy the still used data areas to a new segment 640. After the cleanup job has finished, the old segment 640 is deleted and the newly created segment 640 only contains visible version of document 630 and some free space at the end which can then be reused for new versions. The process can also merge multiple segments $640_1 \ldots _n$ into a single segment 640 if possible.

Figure 9:
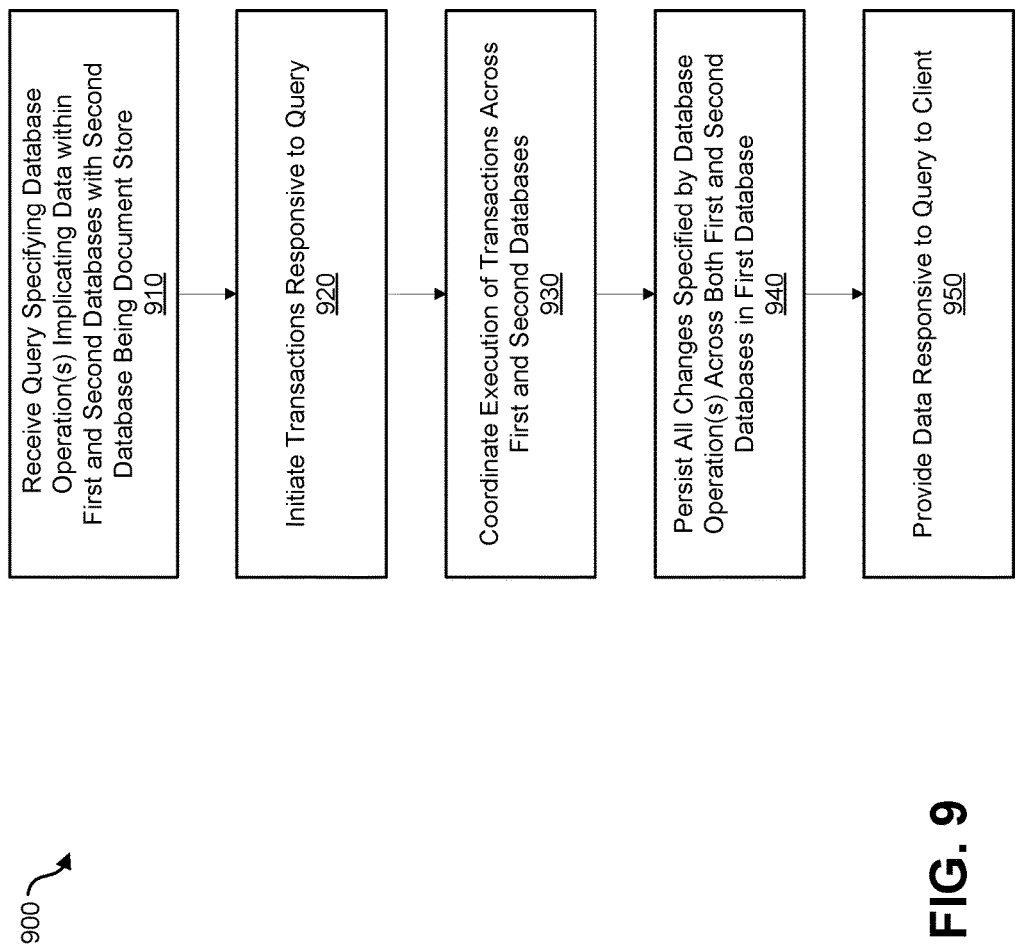
FIG. 9 is a process flow diagram illustrating execution of database transactions spanning two or more databases with one of the databases being a document store.

FIG. 9 is a process flow diagram 900 in which, at 910, a query is received from a client that specifies at least one database operation implicating data within a first database and a second database. The second database can be a document store storing a collection of documents. Thereafter, at 920, a plurality of transactions responsive to the query are initiated to access the data within the first database and the second database. The first database and the second database then coordinate, at 930, execution of the plurality of transactions. As part of the transaction execution, at 940, all changes specified by the at least one database operation are persisted in the first database including changes implicating data stored within the second database. Optionally, at 950, data is later provided to the client that is responsive to the query.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together."

A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, from a client, a query specifying at least one database operation implicating data within a first database and within a second database, the second database comprising a document store storing a collection of documents;
   initiating a plurality of transactions responsive to the query to access the data within the first database and the second database;
   coordinating execution of the plurality of transactions between the first database and the second database, the coordinating comprising notifying, by a transaction manager of the second database to a transaction manager of the first database, of changes in the second database, wherein the transaction manager of the second database acts as a slave to the transaction manager of the first database such that transaction managing facilities of the second database are channeled and managed by the transaction manager of the first database;
   persisting, by a persistence transaction manager of the second database, all changes specified by the at least one database operation in the first database including changes implicating data stored within the second database;
   concurrently notifying, by the transaction manager of the second database, the transaction manager of the first database about the persisted changes, wherein, in response, the transaction manager of the first database uses a commit writer that assigns commit identification (IDs) to stored data; and
   providing data responsive to the query to the client;
   wherein:
   the first database is an in-memory relational database and the second database is a database storing data on physical disk storage.

2. The method of claim 1, wherein the document store stores a collection of documents in JavaScript Object Notation (JSON) format.

3. The method of claim 1, wherein the document store comprises a plurality of partitions defined by a partition specification.

4. The method of claim 3, wherein each partition comprises a plurality of slices and at least one index.

5. The method of claim 4, wherein each slice comprises a plurality of segments in which documents are stored.

6. The method of claim 5, wherein each slice comprises a document vector comprising pointers to each of the documents.

7. The method of claim 6, wherein each document comprises a document header encapsulating metadata characterizing the corresponding document.

8. A system comprising:
   at least one data processor; and
   memory storing instructions which, when executed by at least one data processor, result in operations comprising:
   receiving, from a client, a query specifying at least one database operation implicating data within a first database and within a second database, the second database comprising a document store storing a collection of documents;
   initiating a plurality of transactions responsive to the query to access the data within the first database and the second database;
   coordinating execution of the plurality of transactions between the first database and the second database, the coordinating comprising notifying, by a transaction manager of the second database to a transaction manager of the first database, of changes in the second database, wherein the transaction manager of the second database acts as a slave to the transaction manager of the first database such that transaction managing facilities of the second database are channeled and managed by the transaction manager of the first database;
   persisting, by a persistence transaction manager of the second database, all changes specified by the at least one database operation in the first database including changes implicating data stored within the second database;
   concurrently notifying, by the transaction manager of the second database, the transaction manager of the first database about the persisted changes, wherein, in response, the transaction manager of the first database uses a commit writer that assigns commit identification (IDs) to stored data; and
   providing data responsive to the query to the client;
   wherein:
   the first database is an in-memory relational database and the second database is a database storing data on physical disk storage.

9. The system of claim 8, wherein the document store stores a collection of documents in JavaScript Object Notation (JSON) format.

10. The system of claim 8, wherein the document store comprises a plurality of partitions defined by a partition specification.

11. The system of claim 10, wherein each partition comprises a plurality of slices and at least one index.

12. The system of claim 11, wherein each slice comprises a plurality of segments in which documents are stored.

13. The system of claim 12, wherein each slice comprises a document vector comprising pointers to each of the documents.

14. The system of claim 13, wherein each document comprises a document header encapsulating metadata characterizing the corresponding document.

15. A non-transitory computer program product storing instructions which, when executed by at least one data processor forming part of at least one computing device, result in operations comprising:
 receiving, from a client, a query specifying at least one database operation implicating data within a first database and within a second database, the second database comprising a document store storing a collection of documents;
 initiating a plurality of transactions responsive to the query to access the data within the first database and the second database;
 coordinating execution of the plurality of transactions between the first database and the second database, the coordinating comprising notifying, by a transaction manager of the second database to a transaction manager of the first database, of changes in the second database, wherein the transaction manager of the second database acts as a slave to the transaction manager of the first database such that transaction managing facilities of the second database are channeled and managed by the transaction manager of the first database;
 persisting, by a persistence transaction manager of the second database, all changes specified by the at least one database operation in the first database including changes implicating data stored within the second database;
 concurrently notifying, by the transaction manager of the second database, the transaction manager of the first database about the persisted changes, wherein, in response, the transaction manager of the first database uses a commit writer that assigns commit identification (IDs) to stored data; and
 providing data responsive to the query to the client;
 wherein:
  the first database is an in-memory relational database and the second database is a database storing data on physical disk storage.

16. The computer program product of claim 15, wherein the document store stores a collection of documents in JavaScript Object Notation (JSON) format.

17. The computer program product of claim 15, wherein:
 the document store comprises a plurality of partitions defined by a partition specification;
 each partition comprises a plurality of slices;
 each slice comprises a plurality of segments in which documents are stored; and
 each slice comprises a document vector comprising pointers to each of the documents.

* * * * *